United States Patent
Narula et al.

(10) Patent No.: US 8,987,162 B2
(45) Date of Patent: Mar. 24, 2015

(54) HYDROTHERMALLY STABLE, LOW-TEMPERATURE $NO_x$ REDUCTION $NH_3$-SCR CATALYST

(75) Inventors: Chaitanya K. Narula, Knoxville, TN (US); Xiaofan Yang, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 390 days.

(21) Appl. No.: 13/404,071

(22) Filed: Feb. 24, 2012

(65) Prior Publication Data

US 2013/0224082 A1 Aug. 29, 2013

(51) Int. Cl.

| | |
|---|---|
| *B01J 29/06* | (2006.01) |
| *C01B 39/02* | (2006.01) |
| *B01D 53/94* | (2006.01) |
| *B01J 29/70* | (2006.01) |
| *B01J 29/76* | (2006.01) |
| *B01J 29/78* | (2006.01) |
| *C01B 39/06* | (2006.01) |

(52) U.S. Cl.
CPC ........... *B01J 29/783* (2013.01); *B01D 53/9418* (2013.01); *B01D 2255/20738* (2013.01); *B01D 2255/20761* (2013.01); *B01D 2255/50* (2013.01); *B01D 2258/012* (2013.01); *B01J 29/7065* (2013.01); *B01J 29/763* (2013.01); *B01J 2229/186* (2013.01); *C01B 39/026* (2013.01); *C01B 39/06* (2013.01)
USPC ................... 502/74; 502/60; 502/63; 502/64; 502/66; 502/71; 502/73; 502/77; 423/700

(58) Field of Classification Search
USPC ........... 502/60, 63, 64, 65, 66, 71, 73, 74, 77; 423/700
See application file for complete search history.

(56) References Cited

U.S. PATENT DOCUMENTS

| | | |
|---|---|---|
| 2,950,952 A | 8/1960 | Breck et al. |
| 3,894,107 A | 7/1975 | Butter et al. |
| 3,899,544 A | 8/1975 | Chang et al. |
| 3,928,483 A | 12/1975 | Chang et al. |
| 3,931,349 A | 1/1976 | Keo |
| 3,969,427 A | 7/1976 | Bell et al. |
| 3,998,899 A | 12/1976 | Daviduk et al. |
| 4,025,571 A | 5/1977 | Lago |
| 4,035,430 A | 7/1977 | Dwyer et al. |
| 4,058,576 A | 11/1977 | Chang et al. |
| 4,071,573 A | 1/1978 | Owen et al. |
| 4,124,686 A | 11/1978 | Grose et al. |
| 4,138,440 A | 2/1979 | Chang et al. |
| 4,148,835 A | 4/1979 | Chen et al. |
| 4,278,565 A | 7/1981 | Chen et al. |
| 4,333,859 A | 6/1982 | Vaughan et al. |
| 4,338,475 A | 7/1982 | Pennington et al. |
| 4,404,414 A | 9/1983 | Penick et al. |
| 4,423,274 A | 12/1983 | Daviduk et al. |
| 4,427,789 A | 1/1984 | Miale et al. |
| 4,499,327 A | 2/1985 | Kaiser |
| 4,524,234 A | 6/1985 | Kaiser |
| 4,544,538 A | 10/1985 | Zones |
| 4,596,704 A | 6/1986 | Miale et al. |
| 4,735,927 A | 4/1988 | Gerdes et al. |
| 4,788,042 A | 11/1988 | Marsh et al. |
| 4,788,369 A | 11/1988 | Marsh et al. |
| 4,861,937 A | 8/1989 | Baacke et al. |
| 5,041,690 A | 8/1991 | Harandi et al. |
| 5,045,287 A | 9/1991 | Harandi et al. |
| 5,177,279 A | 1/1993 | Harandi |
| 5,314,665 A | 5/1994 | Iwasa |
| 5,589,147 A | 12/1996 | Farnos et al. |
| 6,323,383 B1 | 11/2001 | Tsuchida et al. |
| 6,709,644 B2 | 3/2004 | Zones et al. |
| 6,919,052 B2 | 7/2005 | Foster et al. |
| 7,288,230 B2 | 10/2007 | Grandlund et al. |
| 7,412,824 B1 | 8/2008 | Newburry et al. |
| 7,438,868 B2 | 10/2008 | Kato |
| 7,442,425 B2 | 10/2008 | Fu et al. |
| 7,575,727 B2 | 8/2009 | Fukushima |
| 7,601,662 B2 | 10/2009 | Bull et al. |
| 7,678,348 B2 | 3/2010 | Han et al. |
| 7,691,340 B2 | 4/2010 | Sinha et al. |
| 2008/0241060 A1* | 10/2008 | Li et al. .................. 423/700 |
| 2011/0020204 A1* | 1/2011 | Bull et al. .................. 423/239.2 |
| 2011/0152513 A1 | 6/2011 | Yao et al. |
| 2012/0039759 A1 | 2/2012 | Narula et al. |
| 2012/0093702 A1* | 4/2012 | Andersen et al. ............. 423/210 |

FOREIGN PATENT DOCUMENTS

| | | |
|---|---|---|
| EP | 0099650 A1 | 2/1984 |
| EP | 0130368 A1 | 1/1985 |
| RU | 2264852 C1 | 11/2005 |
| UA | 8211 | 7/2005 |
| WO | 90/12855 A1 | 11/1990 |
| WO | 2008/132458 A2 | 11/2008 |

OTHER PUBLICATIONS

International Search Report dated Jun. 20, 2013 issued in International Application No. PCT/UA2013/027206.

* cited by examiner

*Primary Examiner* — Elizabeth Wood
(74) *Attorney, Agent, or Firm* — Scully, Scott, Murphy & Presser, P.C.

(57) ABSTRACT

A catalyst composition includes a heterobimetallic zeolite characterized by a chabazite structure loaded with copper ions and at least one trivalent metal ion other than $Al^{3+}$. The catalyst composition decreases $NO_x$ emissions in diesel exhaust and is suitable for operation in a catalytic converter.

15 Claims, 2 Drawing Sheets

HYDROTHERMALLY STABLE, LOW-TEMPERATURE $NO_x$ REDUCTION $NH_3$-SCR CATALYST

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

CROSS-REFERENCE TO RELATED APPLICATIONS

Specifically referenced is U.S. patent application Ser. No. 12/855,794 filed on Aug. 13, 2010, Publication No. 20120039759 published on Feb. 16, 2012, entitled "Zeolite-Based SCR Catalysts and Their Use in Diesel Engine Emission Treatment" by Chaitanya K. Narula and Xiaofan Yang, the entire disclosure of which is incorporated herein by reference.

BACKGROUND OF THE INVENTION

Diesel engines are known to be significantly more fuel efficient than their gasoline counterparts. Therefore, the introduction of diesel engine in on-road and off-road systems (e.g., industrial or household equipment, such as heavy machinery and lawnmowers) is highly desirable. Furthermore, the gasoline engines, operating in oxygen rich environment (lean gasoline engines) are also more fuel efficient than currently used stoichiometric engines.

The high fuel efficiency of diesel engines and lean gasoline engines results in oxygen-rich (i.e., "lean") exhaust that primarily contains $NO_x$ gases. Although $NO_x$ gases can be efficiently removed from oxygen-poor exhausts, as produced in gasoline engine emissions, the removal of $NO_x$ gases in diesel/lean gasoline engine lean emissions continues to be a significant challenge. In particular, the standard three-way catalyst works well for gasoline engines but does not meet EPA regulatory requirements when used for diesel engines.

In order to meet EPA regulatory requirements for diesel engines, extensive efforts are under way to find catalysts that can effectively treat $NO_x$ in the oxygen-rich emissions emitted by diesel engines. The leading approach for reduction of $NO_x$ in diesel emissions is selective catalytic reduction (SCR). In SCR, ammonia or urea is often employed as a reductant. The best known $NH_3$-SCR catalysts for $NO_x$ reduction under the lean environment of diesel engine emissions are Cu-ZSM-5 and Fe-ZSM-5. These have been shown to function effectively only within narrow temperature ranges. Cu-ZSM-5 generally exhibits a better $NO_x$ reduction activity at lower temperatures while Fe-ZSM-5 exhibits better activity at higher temperatures. Thus, a combination of Cu-ZSM-5 and Fe-ZSM-5 zeolites (i.e., as a heterogeneous mixture) has been used in an effort to effectively treat $NO_x$ within a broadened temperature range. The most recent generation $NH_3$-SCR catalyst is based on Cu-SSZ-13 and is now commercially available.

Although the Cu/Fe mixtures provide an improvement in emissions processing for diesel-operated passenger vehicles, the Cu/Fe mixtures is significantly inadequate at low temperatures. In particular, the catalysts currently employed do not efficiently reduce $NO_x$ emissions at low temperatures, such as 150-200° C., which is more critical in off-road diesel engines than in passenger vehicles. Moreover, the Cu/Fe mixture may be adequately efficient only within separate narrow temperature ranges, e.g., a high and a low temperature range. However, particularly for off-road diesel engines that can operate under a broad range of temperatures, there would be a significant benefit in a catalyst that can operate efficiently under a wide range of temperatures (for example, from 150° C. to 650° C.). If gasoline engine is operated in lean mode, not much $NO_x$ is produced at low temperature. However, the catalyst described in this inventions is suitable for use with gasoline engines operating in lean mode as well as diesel engines used for transportation (cars, trucks, railroad engines, ships, etc.)

BRIEF SUMMARY OF THE INVENTION

In accordance with examples of the present invention, the foregoing and other objects are achieved by a catalyst composition that includes a heterobimetallic zeolite characterized by a chabazite structure loaded with copper ions and at least one trivalent metal ion other than $Al^{3+}$. The catalyst composition decreases $NO_x$ emissions in diesel exhaust and is suitable for operation in a catalytic converter.

Figure 1:
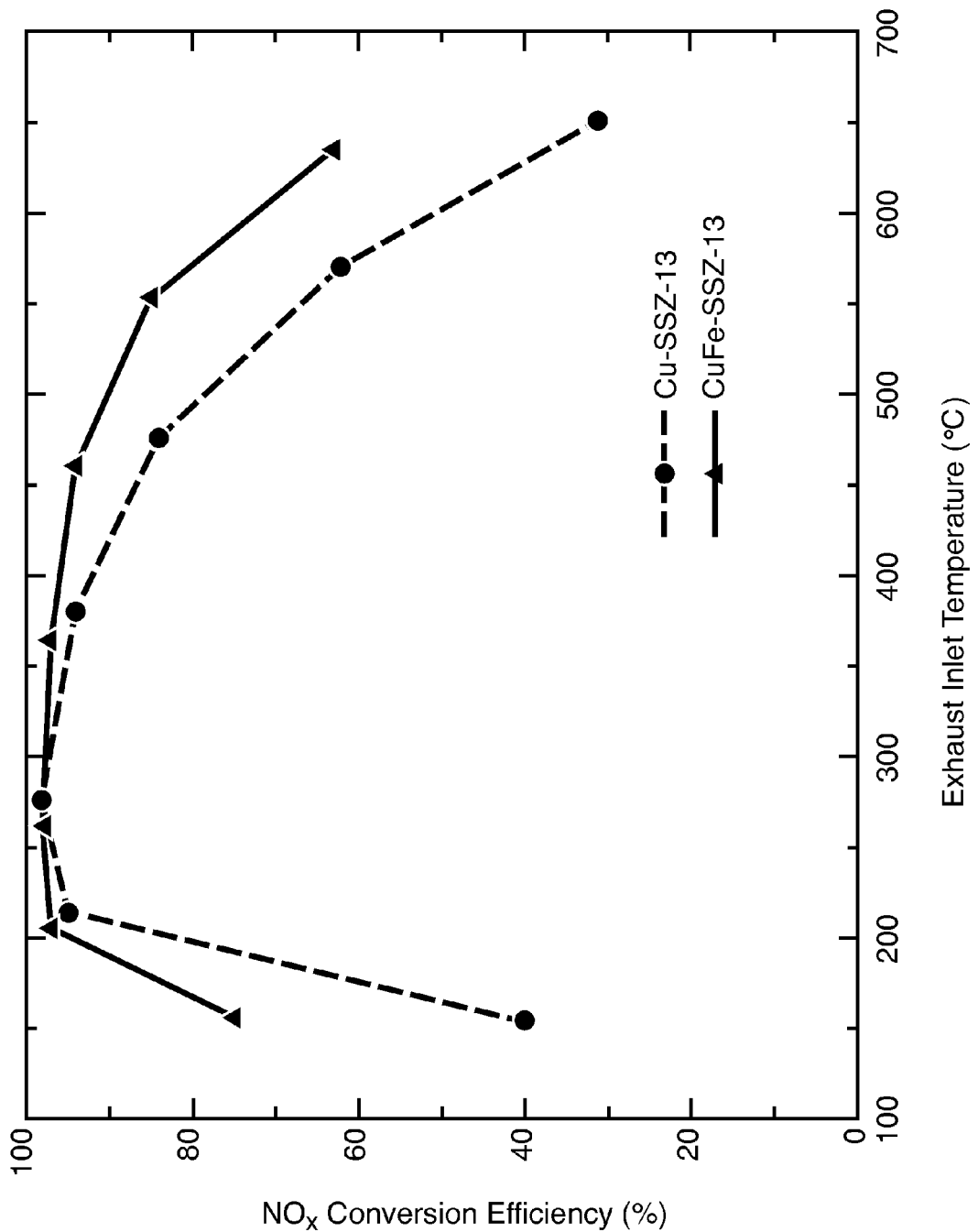
FIG. 1 is a graph showing comparative performance of CuFe-SSZ-13 and Cu-SSZ-13 catalysts in accordance with examples of the present invention.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is directed to a catalyst for mitigating (i.e., removing or reducing) $NO_x$ emissions from hydrocarbon (for example, diesel, gasoline and/or kerosene exhaust). The catalyst includes a new class of heterobimetallic zeolites based on chabazite structure such as CuFe-SSZ-13, for example. The new zeolites described herein overcome the hydrothermal durability issues of all known $NH_3$-SCR catalysts for $NO_x$ reduction while preserving their high $NO_x$ reduction capability at low temperatures.

The zeolite considered herein can be any of the porous aluminosilicate structures known in the art that are stable under high temperature conditions, i.e., of at least 100° C., 150° C., 200° C., 250° C., 300° C., and higher temperatures up to, for example, 500° C., 550° C., 600° C., 650° C., 700° C., 750° C., 800° C., 850° C., or 900° C. In particular examples of the present invention, the zeolite is stable from at least 100° C. and up to 700° C. Typically, the zeolite is ordered by having a crystalline or partly crystalline structure. The zeolite can generally be described as a three-dimensional framework containing silicate ($SiO_2$ or $SiO_4$) and aluminate ($Al_2O_3$ or $AlO_4$) units that are interconnected (i.e., cross-linked) by the sharing of oxygen atoms.

The zeolite can be microporous (i.e., pore size of less than 2 μm), mesoporous (i.e., pore size within 2-50 μm, or sub-range therein), or a combination thereof. In several examples of the present invention, the zeolite material is completely or substantially microporous. By being completely or substantially microporous, the pore volume due to micropores can be, for example, 100%, or at least 95%, 96%, 97%, 98%, 99%, or 99.5%, with the remaining pore volume being due to mesopores, or in some examples of the present invention, macropores (pore size greater than 50 μm). In other examples of the present invention, the zeolite material is completely or substantially mesoporous. By being completely or substantially mesoporous, the pore volume due to mesopores can be, for example, 100%, or at least 95%, 96%, 97%, 98%, 99%, or 99.5%, with the remaining pore volume being due to micropores, or in some examples of the present invention, macropores. In yet other examples of the present invention, the zeolite material contains an abundance of both micropores and mesopores. By containing an abundance of both micropores and mesopores, the pore volume due to mesopores can be, for example, up to, at least, or precisely 50%, 60%, 70%, 80%, or 90%, with the pore volume balance being due to mesopores, or vice-versa.

The various forms of zeolite are commonly known by respective abbreviations such as, for example, ABW, ACO, AEI, AEN, AFG, AFN, AFT, AFX, APC, APD, ATN, ATT, ATV, AWO, AWW, BCT, BIK, BOF, BRE, CAS, CDO, CHA, DFT, DOH, EAB, EPI, ERI, ESV, FAR, FRA, GIS, GIU, IHW, ITE, ITW, JBW, JRY, KFI, LAU, LEV, LIO, LOS, LTA, LTN, MAR, MON, MTF, MWW, NAT, NSI, OWE, PAU, PHI, RHO, RTE, RTH, RWR, SAS, SAT, SAV, SBN, SIV, SOD, STI, STT, THO, TOL, UEI, UFI, or ZON. Some particular examples of zeolites include the chabazite class of zeolites (for example, SSZ-13, SSZ-62, Phi, SAPO-34, LZ-218, and Linde D). The compositions, structures, and properties of chabazite zeolites are well-known in the art, and have been described in detail, as found in, for example, U.S. Pat. Nos. 4,544,538, 6,709,644, 4,124,686, 4,333,859, and 2,950,952, the contents of which are incorporated herein by reference in their entirety.

The zeolite can have any suitable silica-to-alumina (i.e., $SiO_2/Al_2O_3$ or "Si/Al") ratio. For example, in various examples of the present invention, the zeolite can have a Si/Al ratio of precisely, at least, less than, or up to 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 120, 150, or 200, or a Si/Al ratio within a range bounded by any two of the foregoing values. In particular examples of the present invention, the zeolite possesses a Si/Al ratio of 1 to 45.

In particular examples of the present invention, the zeolite is SSZ-13, which belongs to the ABC-6 family of zeolites, all of which are also considered herein. In particular examples of the present invention, the SSZ-13 zeolite is represented by the formula $RN_aNa_bAl_2.4Si_{33.6}O_{72}.wH_2O$ (1.4<a<27) (0.7<b<4.3)(1<w<7), where RN is N,N,N-1-trimethyladamantammonium.

Typically, the zeolite contains an amount of cationic species. As is well known in the art, the amount of cationic species is generally proportional to the amount of aluminum in the zeolite. This is because the replacement of silicon atoms with lower valent aluminum atoms necessitates the presence of countercations to establish a charge balance. Some examples of cationic species include hydrogen ions ($H^+$), alkali metal ions, alkaline earth metal ions, and main group metal ions. Some examples of alkali metal ions that may be included in the zeolite include lithium ($Li^+$), sodium ($Na^+$), potassium ($K^+$), rubidium ($Rb^+$), and cesium ($Cs^+$). Some examples of alkaline earth metal ions that may be included in the zeolite include ($Be^{2+}$), magnesium ($Mg^{2+}$), calcium ($Ca^{2+}$), strontium ($Sr^{2+}$), and barium ($Ba^{2+}$). Some examples of main group metal ions that may be included in the zeolite include boron ($B^{3+}$), gallium ($Ga^{3+}$), indium ($In^{3+}$), and arsenic ($As^{3+}$). In some examples of the present invention, a combination of cationic species is included. The cationic species can be in a trace amount (e.g., no more than 0.01 or 0.001%), or alternatively, in a significant amount (e.g., above 0.01%, and up to, for example, 0.1, 0.5, 1, 2, 3, 4, or 5% by weight of the zeolite).

The zeolite described above is loaded with an amount of copper ions. The copper ions can be cuprous ($Cu^+$) or cupric ($Cu^{2+}$) in nature. The copper loading can be any suitable amount. In different examples of the present invention, the copper loading is precisely, at least, less than, or up to, for example, 0.01%, 0.02%, 0.03%, 0.04%, 0.05%, 0.06%, 0.07%, 0.08%, 0.09%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or a copper loading within a range bounded by any two of the foregoing values, wherein the loading is expressed as the amount of metal by weight of the zeolite. In particular examples of the present invention, the copper loading is any value up to 2.5%.

In addition to copper ions, the zeolite catalyst of the instant invention also includes at least one trivalent metal ion. As used herein, the term "trivalent metal ion" is defined as a trivalent metal ion other than aluminum ($Al^{3+}$). Without wishing to be bound by any theory, it is believed that the trivalent metal is incorporated into the zeolite material. Thus, the incorporated trivalent metal ion is believed to be bound in the zeolite to an appropriate number of oxygen atoms, i.e., as a metal oxide unit in close proximity (e.g., within electronic contact or communication) to the copper ions. The close proximity between the trivalent metal ions and copper ions is believed to cause a combined effect different than the cumulative effect of these ions when they are not in such close proximity. The effect primarily considered herein is the effect on the resulting catalyst's ability to process $NO_x$ gases (i.e., the catalyst's $NO_x$ conversion ability).

In some examples of the present invention, only one type of trivalent metal ion aside from aluminum is incorporated into the zeolite. In other examples of the present invention, at least two types of trivalent metal ions aside from aluminum are incorporated into the zeolite. In yet other examples of the present invention, at least three types of trivalent metal ions aside from aluminum are incorporated into the zeolite. In yet other examples of the present invention, precisely two or precisely three types of trivalent metal ions aside from aluminum are incorporated into the zeolite.

Each of the trivalent metal ions can be included in any suitable amount, such as, precisely, at least, less than, or up to, for example, 0.01%, 0.02%, 0.03%, 0.04%, 0.05%, 0.06%, 0.07%, 0.08%, 0.09%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, or 2.5%, or an amount within a range bounded by any two of the foregoing values. In particular examples of the present invention, each of the trivalent metal ions can be included in an amount of, precisely, at least, less than, or up to 2.5%. In examples of the present invention where more than one type of trivalent metal ion is included, the loading of each metal can be independently selected from any of the above exemplary amounts or ranges therein. In other examples of the present invention, the total amount of trivalent metal ions other than aluminum conforms to any of the exemplary values provided above.

In a first set of examples of the present invention, at least one trivalent metal ion is selected from trivalent transition metal ions. The one or more transition metals can be selected from any or a select portion of the following types of transition metals: elements of Groups IIIB (Sc group), IVB (Ti group), VB (V group), VIB (Cr group), VIIB (Mn group), VIIIB (Fe and Co groups) of the Periodic Table of the Elements. Some examples of trivalent transition metal ions include $Sc^{3+}$, $Y^{3+}$, $V^{3+}$, $Nb^{3+}$, $Cr^{3+}$, $Fe^{3+}$, and $Co^{3+}$. In other examples of the present invention, the trivalent metal ion excludes all transition metal ions, or alternatively, excludes any one, two, or more classes or specific examples of transition metal ions provided above. In particular examples of the present invention, the trivalent transition metal ions include $Sc^{3+}$, or $Fe^{3+}$, or a combination thereof.

In a second set of examples of the present invention, at least one trivalent metal ion is selected from trivalent main group metal ions. The one or more main group metals can be selected from any or a select portion of elements of Group IIIA (B group) and/or Group VA (N group) of the Periodic Table, other than aluminum. Some examples of trivalent main group metal ions include $Ga^{3+}$, $In^{3+}$, $As^{3+}$, $Sb^{3+}$, and $Bi^{3+}$. In other examples of the present invention, the trivalent metal ion excludes all main group metal ions other than aluminum, or alternatively, excludes any one, two, or more classes or specific examples of main group metal ions provided above. In particular examples of the present invention, the trivalent main group metal ions include at least $In^{3+}$.

In a third set of examples of the present invention, at least one trivalent metal ion is selected from trivalent lanthanide metal ions. Some examples of trivalent lanthanide metal ions considered herein include $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$. In particular examples of the present invention, the trivalent lanthanide metal ion is selected from one or a combination of $La^{3+}$, $Ce^{3+}$, $Pr^{3+}$, and $Nd^{3+}$. In further particular examples of the present invention, the trivalent lanthanide metal ion is or includes $La^{3+}$.

In a fourth set of examples of the present invention, at least two trivalent metal ions are selected from trivalent transition metal ions. Some combinations of trivalent transition metal ions considered herein include $Sc^{3+}$ in combination with one or more other trivalent transition metal ions, or $Fe^{3+}$ in combination with one or more other trivalent transition metal ions, or $Y^{3+}$ in combination with one or more other trivalent transition metal ions.

In a fifth set of examples of the present invention, at least two trivalent metal ions are selected from trivalent main group metal ions. Some combinations of trivalent main group metal ions considered herein include $In^{3+}$ in combination with one or more other trivalent main group metal ions, or $Ga^{3+}$ in combination with one or more other trivalent main group metal ions, or $As^{3+}$ in combination with one or more other trivalent main group metal ions.

In a sixth set of examples of the present invention, at least two trivalent metal ions are selected from trivalent lanthanide metal ions. Some combinations of trivalent lanthanide metal ions considered herein include $La^{3+}$ in combination with one or more other trivalent lanthanide metal ions, or $Ce^{3+}$ in combination with one or more other trivalent lanthanide metal ions, or $Pr^{3+}$ in combination with one or more other trivalent lanthanide metal ions, or $Nd^{3+}$ in combination with one or more other trivalent lanthanide metal ions.

In a seventh set of examples of the present invention, at least one trivalent metal ion is a trivalent transition metal ion and at least one trivalent metal ion is a trivalent lanthanide metal ion. For example, in particular examples of the present invention, at least one trivalent metal ion is selected from $Sc^{3+}$, $Fe^{3+}$, and/or $Y^{3+}$, and another trivalent metal ion is selected from $La^{3+}$, $Ce^{3+}$, $Pr^{3+}$, and/or $Nd^{3+}$.

In an eighth set of examples of the present invention, at least one trivalent metal ion is a trivalent transition metal ion and at least one trivalent metal ion is a trivalent main group metal ion. For example, in particular examples of the present invention, at least one trivalent metal ion is selected from $Sc^{3+}$, $Fe^{3+}$, and/or $Y^{3+}$, and another trivalent metal ion is selected from $In^{3+}$, $Ga^{3+}$, and/or $In^{3+}$.

In a ninth set of examples of the present invention, at least one trivalent metal ion is a trivalent main group metal ion and at least one trivalent metal ion is a trivalent lanthanide metal ion. For example, in particular examples of the present invention, at least one trivalent metal ion is selected from $Sc^{3+}$, $Fe^{3+}$, and/or $Y^{3+}$, and another trivalent metal ion is selected from $La^{3+}$, $Ce^{3+}$, $Pr^{3+}$, and/or $Nd^{3+}$.

In a tenth set of examples of the present invention, at least three trivalent metal ions are included in the zeolite. The at least three trivalent metal ions can be selected from trivalent transition metal ions, trivalent main group metal ions, and/or trivalent lanthanide metal ions.

In particular examples of the present invention, one, two, three, or more trivalent metal ions are selected from $Sc^{3+}$, $Fe^{3+}$, $Y^{3+}$, $La^{3+}$, $Ce^{3+}$, $Pr^{3+}$, $Nd^{3+}$, $In^{3+}$, and/or $Ga^{3+}$. In more particular examples of the present invention, one, two, three, or more trivalent metal ions are selected from $Sc^{3+}$, $Fe^{3+}$, $La^{3+}$, and/or $In^{3+}$.

The zeolite catalyst described above is typically not coated with a metal-containing film or layer. However, the instant invention also contemplates the zeolite catalyst described above coated with a metal-containing film or layer as long as the film or layer does not substantially impede the catalyst from effectively functioning as a $NO_x$ reduction catalyst as intended herein. By being coated, the film or layer resides on the surface of the zeolite. In some examples of the present invention, the surface of the zeolite refers to only the outer surface (i.e., as defined by the outer contour area of the zeolite catalyst), while in other examples of the present invention, the surface of the zeolite refers to or includes inner surfaces of the zeolite, such as the surfaces within pores or channels of the zeolite. The metal-containing film or layer can serve, for example, to adjust the physical characteristics of the catalyst, the catalytic efficiency, or catalytic selectivity. Some examples of metal-containing surfaces include the oxides and/or sulfides of the alkali metals, alkaline earth metals, divalent transition or main group metals (e.g., $Zn^{2+}$, $Fe^{2+}$, $Co^{2+}$, $Ni^{2+}$, $Pd^{2+}$, $Pt^{2+}$, $Sn^{2+}$, Or $Pb^{2+}$), tetravalent transition metals (e.g., $Ti^{4+}$, $Zr^{4+}$, $Rh^{4+}$, $Ir^{4+}$, $Mn^{4+}$, $Ge^{4+}$, $Sn^{4+}$, and $Te^{4+}$), pentavalent transition or main group metals (e.g., $Nb^{5+}$, $Ta^{5+}$, and $Sb^{5+}$), and hexavalent transition metals (e.g., $Cr^{6+}$, $Mo^{6+}$, and $W^{6+}$). In other examples of the present invention, one or more classes or specific types of any of the above additional metal ions are excluded from the zeolite catalyst.

The catalyst described herein can be synthesized by any suitable method known in the art. The method considered herein should incorporate the metal ions (i.e., copper and one or more trivalent metal ions) homogeneously into the zeolite. The resulting metal-loaded catalyst contains a homogeneous distribution of the metal ions on a molecular level, i.e., the catalyst does not contain macroscopic regions containing only one type of metal ion, as would be obtained by grinding and mixing of two zeolite sources that each contain a different metal ion.

In particular examples of the present invention, the catalyst described herein is prepared by, first, impregnating the zeolite with the metals to be loaded. The impregnating step can be achieved by, for example, treating the zeolite with one or more solutions containing the metals to be loaded. By treating the zeolite with the metal-containing solution, the metal-containing solution is contacted with the zeolite such that the solution is absorbed into the zeolite, preferably into the entire volume of the zeolite.

In one embodiment, the impregnating step is achieved by treating the zeolite with a solution that contains all of the metals to be loaded. In another embodiment, the impregnating step is achieved by treating the zeolite with two or more solutions, wherein the different solutions contain different metals or combinations of metals. Each treatment of the zeolite with an impregnating solution corresponds to a separate impregnating step. Typically, when more than one impregnating step is employed, a drying and/or thermal treatment step is employed between the impregnating steps.

The metal-impregnating solution contains at least one or more metal ions to be loaded into the zeolite, as well as a liquid carrier for distributing the metal ions into the zeolite. The metal ions are generally in the form of metal salts. Preferably, the metal salts are completely dissolved in the liquid carrier. The metal salt contains one or more metal ions in ionic association with one or more counter-anions. Any one or more of the metal ions described above can serve as the metal ion portion. The counter-anion can be selected from, for example, halides ($F^-$, $Cl^-$, $Br^-$, or $I^-$), carboxylates (e.g., formate, acetate, propionate, or butyrate), sulfate, nitrate, phosphate, chlorate, bromate, iodate, hydroxide, $\beta$-diketonate (e.g., acetylacetonate), and dicarboxylates (e.g., oxalate, malonate, or succinate). In some examples of the present invention, the counter-anion may contain one or more metals, including one or more metals to be loaded into the zeolite. Some examples of such counter-anions include titanate, zirconate, vanadate, niobate, tantalate, chromate, molybdate, tungstate, arsenate, antimonate, stannate, and tellurate. In other examples of the present invention, one or more classes or specific types of any of the foregoing counter-anions are excluded from the impregnating solution (or alternatively, excluded from being incorporated into the zeolite).

In particular examples of the present invention, the catalyst is prepared by forming a slurry containing zeolite powder and the metals to be incorporated. The resulting slurry is dried and fired to form a powder. The powder is then combined with organic and/or inorganic binders and wet-mixed to form a paste. The resulting paste can be formed into any desired shape, e.g., by extrusion into rod, honeycomb, or pinwheel structures. The extruded structures are then dried and fired to form the final catalyst. In other examples of the present invention, the zeolite powder, metals, and binders are all combined together to form a paste, which is then extruded and fired.

After impregnating the zeolite, the metal-loaded zeolite is typically dried and/or subjected to a thermal treatment step (e.g., a firing or calcination step). The thermal treatment step functions to permanently incorporate the impregnated metals into the zeolite, e.g., by forming metal-oxide bonds within the zeolite material. In different examples of the present invention, the thermal treatment step can be conducted at a temperature of at least 100° C., 150° C., 200° C., 250° C., 300° C., 350° C., 400° C., 450° C., 500° C., 550° C., 600° C., 650° C., 700° C., 750° C., or 800° C., or within a range therein, for a time period of, for example, 15 minutes, 30 minutes, 1 hour, 2 hours, 6 hours, 12 hours, 24 hours, 30 hours, 36 hours, or 48 hours, or within a range therein. In particular examples of the present invention, the thermal treatment step is conducted at a temperature of at least 500° C. for a time period of at least two hours. In some examples of the present invention, the thermal treatment step includes a temperature ramping step from a lower temperature to a higher temperature, and/or from a higher temperature to a lower temperature. For example, the thermal treatment step can include a ramp stage from 100° C. to 700° C., or vice-versa, at a rate of 1, 2, 5, or 10° C./min.

Generally, the one or more heat treatment steps are conducted under normal atmospheric pressure. However, in some examples of the present invention, an elevated pressure (e.g., above 1 atm and up to 2, 5, or 10 atm) is employed, while in other examples of the present invention, a reduced pressure (e.g., below 1, 0.5, or 0.2 atm) is employed. Furthermore, although the heat treatment steps are generally conducted under a normal air atmosphere, in some examples of the present invention, an elevated oxygen, reduced oxygen, or inert atmosphere is used. Some gases that can be included in the processing atmosphere include, for example, oxygen, nitrogen, helium, argon, carbon dioxide, and mixtures thereof.

Generally, the zeolite catalyst described herein is in the form of a powder. In a first set of examples of the present invention, at least a portion, or all, of the particles of the powder have a size less than a micron (i.e., nanosized particles). The nanosized particles can have a particle size of precisely, at least, up to, or less than, for example, 1, 2, 5, 10, 20, 30, 40, 50, 60, 70, 80, 90, 100, 150, 200, 250, 300, 350, 400, 450, 500, 550, 600, 650, 700, 750, 800, 850, 900, or 950 nanometers (nm), or a particle size within a range bounded by any two of the foregoing values. In a second set of examples of the present invention, at least a portion, or all, of the particles of the powder have a size at or above 1 micron in size. The micron-sized particles can have a particle size of precisely, at least, up to, or less than, for example, 1, 2, 5, 10, 20, 30, 40, 50, 60, 70, 80, 90, or 100 microns ($\mu m$), or a particle size within a range bounded by any two of the foregoing values. In some examples of the present invention, single crystals or grains of the catalyst correspond to any of the sizes provided above, while in other examples of the present invention, crystals or grains of the catalyst are agglomerated to provide agglomerated crystallites or grains having any of the above exemplary dimensions.

In other examples of the present invention, the zeolite catalyst can be in the form of a film, a coating, or a multiplicity of films or coatings. The thickness of the coatings or multiplicity of coatings can be, for example, 1, 2, 5, 10, 50, or 100 microns, or a range therein, or up to 100 micron thickness. In yet other examples of the present invention, the zeolite catalyst is in the form of a non-particulate (i.e., continuous) bulk solid. In still other examples of the present invention, the zeolite catalyst can be fibrous or in the form of a mesh.

The catalyst can also be mixed with or affixed onto a support material suitable for operation in a catalytic converter. The support material can be a powder (e.g., having any of the above particle sizes), granular (e.g., 0.5 mm or greater particle size), a bulk material, such as a honeycomb monolith of the flow-through type, a plate or multi-plate structure, or corrugated metal sheets. If a honeycomb structure is used, the honeycomb structure can contain any suitable density of cells. For example, the honeycomb structure can contain 100, 200, 300, 400, 500, 600, 700, 800, or 900 cells/in$^2$ (or from 62-140 cells/cm$^2$) or greater. The support material is generally constructed of a refractory composition, such as those containing cordierite, mullite, alumina (e.g., $\alpha$-, $\gamma$-, or $\theta$-alumina), or zirconia, or a combination thereof. Honeycomb structures, in particular, are described in detail in, for example, U.S. Pat. Nos. 5,314,665, 7,442,425, and 7,438,868, the contents of which are incorporated herein by reference in their entirety. When corrugated or other types of metal sheets are used, these can be layered on top of each other with catalyst material supported on the sheets such that passages remain that allow the flow of exhaust gas between the sheets. The layered sheets can also be formed into a structure, such as a cylinder, by winding the sheets.

The catalyst described herein preferably exhibits a $NO_x$ conversion temperature profile that is improved over that by Cu-SSZ-13 as described in U.S. Pat. No. 7,601,662.

In a first set of examples of the present invention, the catalyst described herein preferably exhibits a high $NO_x$ conversion at 150° C. As used herein, the phrase "high $NO_x$ conversion at 150° C." is defined as a $NO_x$ conversion of at least or above 50%, 55%, 60%, 65%, 70%, 75%, 80%, or 85% at 150° C.

In a second set of examples of the present invention, the catalyst described herein preferably exhibits a high $NO_x$ conversion at 200° C. As used herein, the phrase "high $NO_x$ conversion at 200° C." is defined as a $NO_x$ conversion of at least or above 80%, 85%, or 90% at 200° C.

In a third set of examples of the present invention, the catalyst described herein preferably exhibits a high $NO_x$ conversion at a temperature in the range of 250° C. to 450° C. As used herein, the phrase "high $NO_x$ conversion at 250-450° C." is defined as a $NO_x$ conversion of at least or above 60%, 65%, 70%, 75%, 80%, 85%, or 90% at a temperature of 250° C., 300° C., 350° C., 400° C., or 450° C., at a temperature in the range of 250° C. to 450° C., or temperatures that vary within the range.

In a fourth set of examples of the present invention, the catalyst described herein preferably exhibits a high $NO_x$ conversion at a temperature in the range of 500° C. to 525° C. As used herein, the phrase "high $NO_x$ conversion at 500-525° C." is defined as a $NO_x$ conversion of at least or above 60%, 65%, 70%, 75%, 80%, or 85% at a temperature in the range of 500° C. to 525° C., or temperatures that vary within the range.

In a fifth set of examples of the present invention, the catalyst described herein preferably exhibits a high $NO_x$ conversion at a temperature of 550° C. As used herein, the phrase "high $NO_x$ conversion at 550° C." is defined as a $NO_x$ conversion of at least or above 60%, 65%, 70%, 75%, or 80% at a temperature of 550° C.

In a sixth set of examples of the present invention, the catalyst described herein preferably exhibits a high $NO_x$ conversion at a temperature in the range of 600° C. to 650° C. As used herein, the phrase "high $NO_x$ conversion at 600-650° C." is defined as a $NO_x$ conversion of at least or above 60%, 65%, 70%, 75%, or 80% at a temperature in the range of 600° C. to 650° C., or temperatures that vary within the range.

In a seventh set of examples of the present invention, the catalyst described herein preferably exhibits a high $NO_x$ conversion at 150° C. while also exhibiting a high $NO_x$ conversion at 200° C., and/or a high $NO_x$ conversion at 250-450° C., and/or a high $NO_x$ conversion at 500-525° C., and/or a high $NO_x$ conversion at 550° C., and/or a high $NO_x$ conversion at 600-650° C.

In some examples, the invention is directed to a catalytic converter that contains therein as a catalyst the above-described metal-loaded zeolite catalyst. The catalyst is typically disposed on a refractory supporting element, such as corrugated metal sheets or a honeycomb structure, as described above. The catalytic converter can be any of the catalytic converters known in the art, and particularly, those catalytic converters particularly suited for processing diesel fuel exhaust. The construction and operation of such catalytic converters are well known in the art, as described in detail in, for example, U.S. Pat. Nos. 7,691,340, 7,678,348, 7,575,727, 7,442,425, 7,438,868, 7,412,824, 7,288,230, 6,919,052, and 5,314,665, the contents of which are all herein incorporated by reference in their entirety.

As basic elements, the catalytic converter typically contains the catalyst disposed on a supporting element such that passages are made available for exhaust to pass therethrough, and the supported catalyst enclosed in a metal casing. The metal casing is generally connected with one or more inlets (i.e., pipes) for transferring exhaust gases into the supported catalyst. The metal casing may also include one or more gaskets.

In particular examples of the present invention, the catalytic converter is connected with a source of ammonia in order for ammonia to mix in with the stream of exhaust gas. As is well known in the art, the ammonia functions as a reductant in selective catalytic reduction (SCR) processes. The ammonia can be in any suitable form, such as anhydrous ammonia, aqueous ammonia, urea, ammonium carbonate, ammonium formate, or ammonium carbamate. In some examples of the present invention, the ammonia source is supplied continuously into the exhaust stream before and/or during the time the exhaust stream reaches the catalyst. In other examples of the present invention, the ammonia is supplied intermittently. In other examples of the present invention, the ammonia source is supplied before the exhaust stream reaches the catalyst. In this way, the ammonia source is first absorbed into the catalyst before reacting with the exhaust stream. Generally, an ammonia storage tank is used to contain the ammonia source.

In designing a SCR system, numerous other elements can be interconnected with the catalytic converter and ammonia source. For example, a vaporizer can be included between the ammonia source and catalytic converter for converting (i.e., decomposing) the ammonia source into ammonia gas. A mixer may also be incorporated between the ammonia source and catalytic converter (or between vaporizer and catalytic converter) to mix ammonia with the exhaust stream. Other elements, such as heaters, pumps, and fans, can be included in order to optimize the system. The SCR system can be integrated into any system that makes use of a lean burn engine, particularly those engines that use diesel fuel. The SCR system can be integrated into, for example, the engine system of a passenger vehicle, truck, utility boiler, industrial boiler, solid waste boiler (i.e., as used in the processing of municipal waste), ship, locomotive, tunnel boring machine, submarine, construction equipment, gas turbine, power plant, airplane, lawnmower, or chainsaw.

Examples have been set forth below for the purpose of illustration and to describe certain specific examples of the present invention of the invention. However, the scope of this invention is not to be in any way limited by the examples set forth herein.

Example I

H-SSZ-13 was prepared according to U.S. Pat. No. 4,544, 538. Cu-SSZ-13 was synthesized as following: a 2.664 g sample of $Cu(OAc)_2 \cdot H_2O$ was dissolved in 600 mL de-ionized water (0.022M), followed by addition of H-SSZ-13 (10.00 g). The slurry was stirred for 2 hours at 50° C. The blue colored solid was collected by filtration after cooling, washed with de-ionized water, and calcined in air at 500° C. (10° C./min) for 4 hours to afford Cu-SSZ-13. Elemental analysis: Cu 3.46, Al 4.05%.

CuFe-SSZ-13 was obtained through procedures: 10 g Cu-SSZ-13 was suspended in a water solution of 50 mL 0.015M $Fe(NO_3)_3$, degassed with $N_2$, and kept stirring for 2 hours at 80° C. Yellow solid was obtained after filtration, and the filtrate was clear and colorless. The product was then calcined in the air at 500° C. (2° C./min) for 2 hours to yield pale yellow CuFe-SSZ-13. Elemental analysis: Cu 2.71%, Fe 0.357%, Al 3.86%.

Example II

Cu-SSZ-13 and CuFe-SSZ-13 catalyst powders were comparatively tested. The catalyst powders were mixed with equal amounts (by weight) of inert cordierite and transferred to a bench-top reactor. A de-greening was done in a flow of 8.5% $O_2$, 8% $CO_2$, and 7.25% $H_2O$ with balance $N_2$ at a temperature of 600° C. (inlet gas temperature) and a space velocity of 50,000 $h^{-1}$ for two hours. $NO_x$ conversion efficiency experiments employed simulated diesel exhaust containing 8.5% $O_2$, 8% $CO_2$, 7.25% $H_2O$, 250 ppm $NO_2$, 250 ppm NO, 500 ppm $NH_3$, and $N_2$ as balance at a space velocity of 50,000 $h^{-1}$ and evaluated in the temperature range of 150° C. to 650° C. Results are shown in FIG. 1. Our catalyst, CuFe-SSZ-13 clearly shows better performance in 150-650° C. range. The $NO_x$ conversion performance difference is especially noticeable at 150° C. where Cu-SSZ-13 converts ~40% NOx whereas CuFe-SSZ-13 converts ~75% $NO_x$ under test conditions.

Example III

Figure 2:
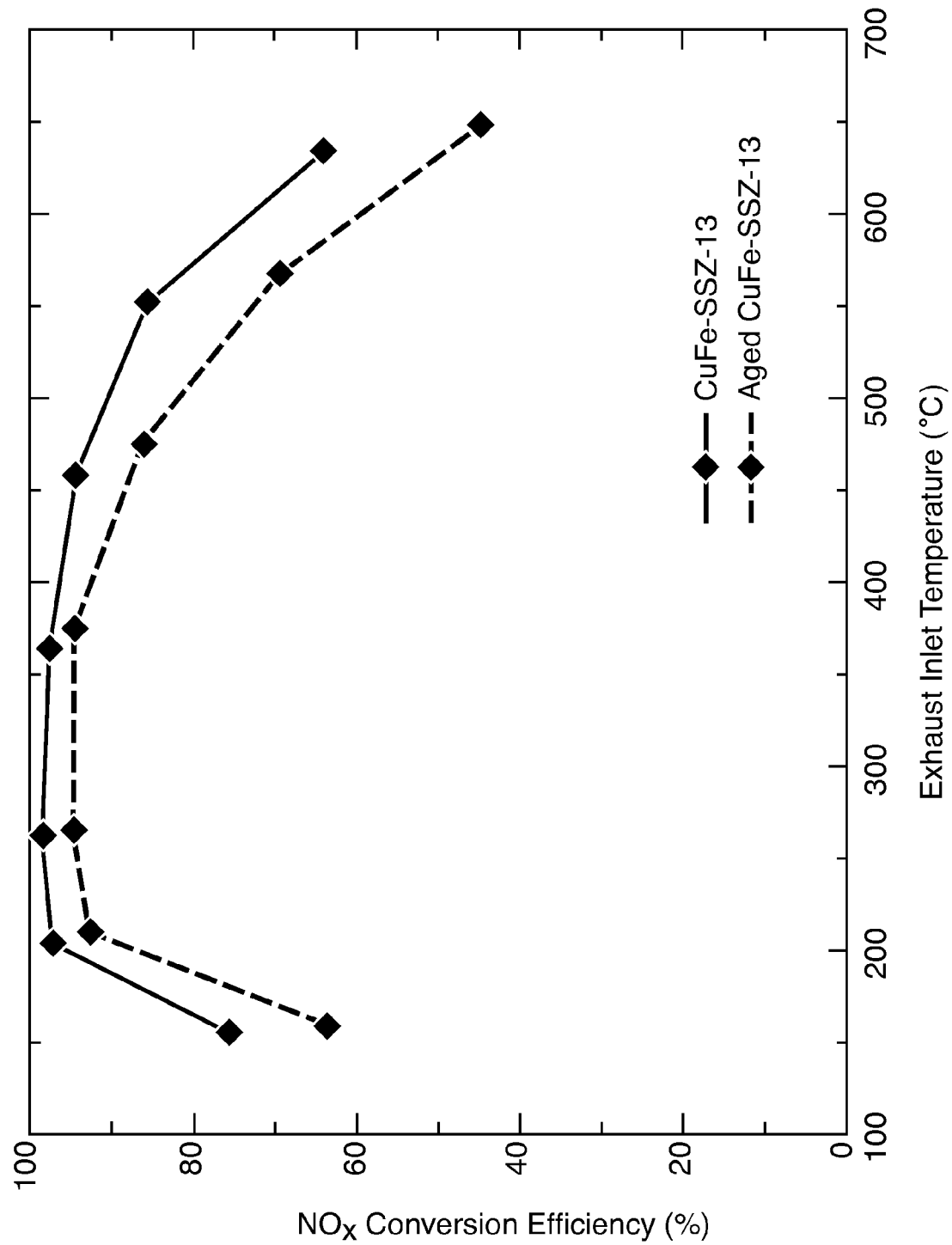
FIG. 2 is a graph showing comparative performance of CuFe-SSZ-13 and aged CuFe-SSZ-13 catalysts in accordance with examples of the present invention.

Accelerated aging was performed on the CuFe-SSZ-13 catalyst powder by employing an aging protocol that exposes catalyst to a temperature of 675° C. for 50 hours under a flow of air containing 10% water. Testing results are shown in FIG. 2.

Our catalyst, CuFe-SSZ-13, demonstrates high hydrothermal durability and has high $NO_x$ conversion performance in 150-650° C. range. The NOx reduction at 150° C. is ~65% which is still better than fresh Cu-SSZ-13, as shown in FIG. 1.

While there has been shown and described what are at present considered to be examples of the invention, it will be obvious to those skilled in the art that various changes and modifications can be prepared therein without departing from the scope of the inventions defined by the appended claims.

What is claimed is:

1. A catalyst composition comprising a heterobimetallic zeolite characterized by a chabazite structure loaded with copper ions and iron(III) ions, wherein said copper ions are present in said catalyst in a loading amount of above 1 wt % and said iron(III) ions are present in said catalyst in a loading amount of less than 1 wt %, and said copper and iron loading amounts are effective to achieve a $NO_x$ conversion at 150° C. of at least 50% in the presence of an ammonia reductant.

2. A catalyst in accordance with claim 1, wherein said iron(III) ions are in combination with at least one other trivalent metal ion.

3. A catalyst in accordance with claim 2, wherein said at least one other trivalent metal ion is a trivalent transition metal ion.

4. A catalyst in accordance with claim 2, wherein said at least one other trivalent metal ion is a trivalent lanthanide metal ion.

5. A catalyst in accordance with claim 2, wherein said at least one other trivalent metal ion is a trivalent main group metal ion.

6. A catalyst in accordance with claim 1, wherein said zeolite comprises CuFe-SSZ-13.

7. A catalytic converter comprising a catalyst loaded onto a refractory substrate, said catalyst comprising a heterobimetallic zeolite characterized by a chabazite structure loaded with copper ions and iron(III) ions, wherein said copper ions are present in said catalyst in a loading amount of above 1 wt % and said iron(III) ions are present in said catalyst in a loading amount of less than 1 wt %, and said copper and iron loading amounts are effective to achieve a $NO_x$ conversion at 150° C. of at least 50% in the presence of an ammonia reductant.

8. A catalytic converter in accordance with claim 7, wherein said iron(III) ions are in combination with at least one other trivalent metal ion.

9. A catalytic converter in accordance with claim 8, wherein said at least one other trivalent metal ion is a trivalent transition metal ion.

10. A catalytic converter in accordance with claim 8, wherein said at least one other trivalent metal ion is a trivalent lanthanide metal ion.

11. A catalytic converter in accordance with claim 8, wherein said at least one other trivalent metal ion is a trivalent main group metal ion.

12. A catalytic converter in accordance with claim 7, wherein said zeolite comprises CuFe-SSZ-13.

13. A catalytic converter in accordance with claim 7, wherein said refractory substrate is characterized by a structure selected from the group consisting of a rod structure, a honeycomb structure, and a pinwheel structure.

14. The catalyst of claim 1, wherein said copper ions are present in said catalyst in a loading amount of at least 1.5 wt % and said iron(III) ions are present in said catalyst in a loading amount of less than 1 wt %.

15. The catalyst of claim 1, wherein said copper ions are present in said catalyst in a loading amount of at least 2 wt % and said iron(III) ions are present in said catalyst in a loading amount of less than 1 wt %.

* * * * *